United States Patent [19]

Kyle

[11] Patent Number: 4,834,190

[45] Date of Patent: May 30, 1989

[54] SPRING TINE AND DETACHABLY SECURED ATTACHMENT

[75] Inventor: Garnet M. Kyle, Dominion City, Canada

[73] Assignee: Kyle Ag-Pro, Inc., Dominion City, Canada

[21] Appl. No.: 134,681

[22] Filed: Dec. 18, 1987

[30] Foreign Application Priority Data

May 28, 1987 [CA] Canada .................................. 538312

[51] Int. Cl.⁴ .............................................. A01B 25/00
[52] U.S. Cl. .................................. 172/704; 172/708; 172/730
[58] Field of Search ................... 172/34, 63, 71, 72, 172/136, 142, 196, 197, 198, 199, 200, 252, 253, 375, 643, 702, 703, 704, 707, 708, 713, 721, 724, 730, 732, 735, 762, 770

[56] References Cited

U.S. PATENT DOCUMENTS

| | | | |
|---|---|---|---|
| 325,839 | 9/1885 | Hogeboom | 172/732 |
| 356,985 | 0/1887 | Clark | 172/708 |
| 423,775 | 3/1890 | Johnson | 172/703 |
| 509,826 | 11/1893 | Randolph | 172/136 |
| 728,347 | 5/1903 | Whitney | 172/762 |
| 1,567,035 | 3/1925 | Carr | 172/708 |
| 1,674,896 | 6/1928 | Garn | 172/708 |
| 1,840,899 | 1/1932 | Hall | 172/703 |
| 2,083,083 | 6/1937 | Nielsen | 172/702 X |
| 2,090,739 | 8/1937 | Wyss | 172/707 |
| 2,211,675 | 8/1940 | Rushbrook | 172/572 |
| 3,139,145 | 1/1963 | Hofer | 172/711 |

FOREIGN PATENT DOCUMENTS 19363 of 1930 Australia .............................. 172/730

Primary Examiner—Richard T. Stouffer
Attorney, Agent, or Firm—Irell & Manella

[57] ABSTRACT

Conventionally, a cultivator and a packer are required as well as a tine harrow in most grain farming operations. The present device consists of a small sweep of approximately two inches width that can be detachably secured to the tines of a tine harrow and adjusted vertically to cultivate the surface of the soil or at any depth up to the maximum depth penetrated by the harrow tines. Alternatively, the sweeps can be reversed on the tines and used as packers. The device may be used for relatively light weeding operations, to facilitate the proper incorporation of herbicides and to provide a level and prepared seed bed.

18 Claims, 2 Drawing Sheets

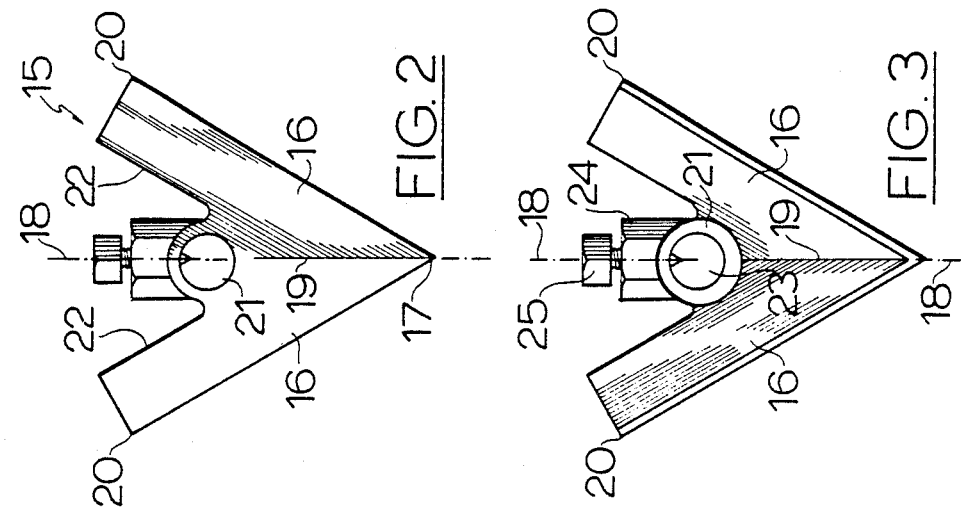
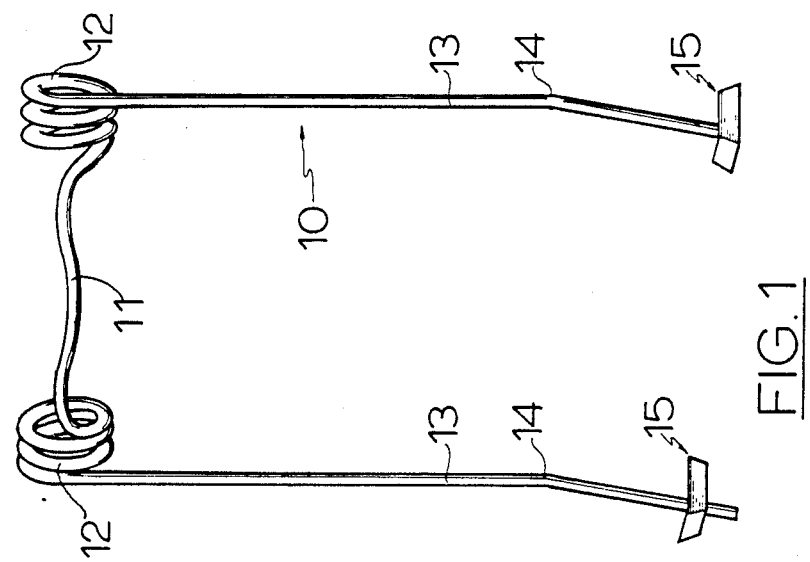

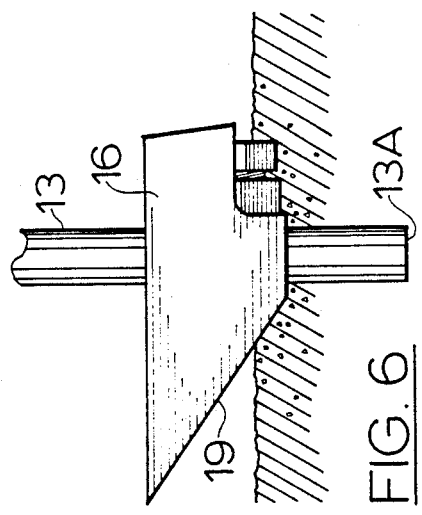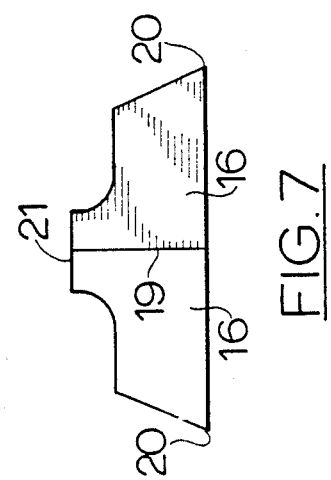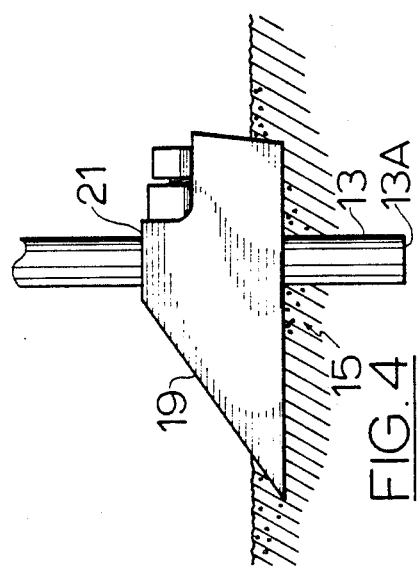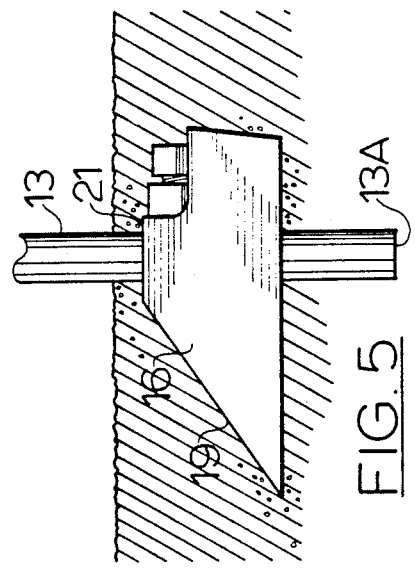

SPRING TINE AND DETACHABLY SECURED ATTACHMENT

BACKGROUND OF THE INVENTION

This invention relates to new and useful improvements in relatively small cultivator attachments designed for use upon harrow tines and the like.

Conventionally, small weeds or volunteer crop often emerges before the seeded crops and it is relatively expensive to attempt to eliminate these with a full sized cultivator which is expensive to operate and in most cases the land becomes dried out more with such an implement thus possibly resulting in poor germination.

Often, tine type harrows are used for this purpose but with the tines being approximately ⅜ths of an inch in diameter, the field normally requires 2 or 3 passes in order to eliminate the weeds and break up a crust if present on such a field.

Furthermore, as many tine type cultivators extend up to 80 feet in width, a relatively large area can be lightly cultivated faster and more economically than using a full size cultivator or repeating the operation several times With a standard tine harrow.

PRIOR ART

Prior art known to applicant includes the following:

U.S. Pat. No. 356,985—Feb. 1, 1987—A. Clark. This shows a planar narrow shovel secured to a spring type rectangular cross sectioned harrow or cultivator tooth.

U.S. Pat. No. 509,826—Nov. 28, 1983—G. W. Randolph. This shows a spade like shovel secured to one end of a cultivator tooth, said tooth being reversible from a cultivator shovel model to an end sharpened mode and vice-versa.

U.S. Pat. No. 1,567,035—Dec. 29, 1925—H. L. Carr. This shows a flat spring type harrow tooth with a planar "A" shovel secured to the lower end of a bracket clamped to the tooth.

U.S. Pat. No. 1,674,896—June 26, 1928—M. E. Garn. This shows a weed cutting attachment for harrow tooth in the form of a transversely extending, substantially vertically situated plate type cutter.

U.S. Pat. No. 2,211,675—Aug. 13, 1940—L. W. Rushbrook. This shows a disc attachment for planar spring tooth harrows.

U.S. Pat. No. 3,139,145—June 30, 1964—W. D. Hofer. This shows a leaf spring mounting for cultivator shanks.

The present invention overcomes these disadvantages by utilizing a tine harrow or other similar implement and attaching what are termed "mini-cultivators" to the tines by means of a set screw. These small cultivators are approximately 2 inches in width and are easily attached and detached from the tines of a harrow and can be adjusted vertically along the tine to give either surface cultivation or at any depth up to the maximum penetration of such tines.

In accordance with the invention there is provided a cultivator attachment for substantially cylindrical tines of harrows, weeders, packers and the like comprising a relatively small sweep type shovel, centrally located aperture collar means secured to said shovel and means to detachably secure said shovel by said collar around an associated tine, said shovel being adjustably positionable from a position adjacent the lower the end of the tine and upwardly therefrom.

Another aspect of the invention is to provide, in combination with a substantially cylindrical harrow tine, a cultivator attachment, said attachment including a relatively small sweep type shovel, centrally located apertured collar means secured to said shovel and means to detachably secure said shovel by said collar around said tine, said shovel being adjustably positioned from a position adjacent the lower end of said tine and upwardly thereof.

A further advantage of the present invention is that the small cultivator shovels may be turned upside down and attached to the tines at a pre-determined distance from the lower ends thereof so that the tine harrow may be used as a packer with the angle of inclination being adjustable by the mechanism normally provided on tine harrows.

A still further advantage of the invention is that by manufacturing the devices from tempered steel, so that wear upon the small cultivators is minimized.

Still another advantage of the device is to provide the cultivator shovel of the character herewithin described which is simple in construction, economical in manufacture and otherwise well suited to the purpose of which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is an isometric view of a double tine assembly showing the invention on one tine as used as a cultivator and upon the other tine as used as a packer although it should be understood that one or the other mode is used at any one time.

FIG. 2 is a top plan view of one of the cultivator shovels per se.

FIG. 3 is an underside view of FIG. 2.

FIG. 4 is a partially schematic side elevation of a cultivator upon a harrow tine and showing same adjusted for substantially surface cultivation.

FIG. 5 is a view similar to FIG. 4 but showing the cultivator shovel adjusted for sub-soil cultivation.

FIG. 6 is a view similar to FIG. 4 but showing the cultivator shovel reversed and used as a packer.

FIG. 7 is a front view of FIG. 2. In the drawings like characters of reference indicate corresponding parts in the different figures.

DETAILED DESCRIPTION

Proceeding therefore to describe the invention in detail, reference should first be made to FIG. 1 in which 10 illustrates generally a conventional double spring toothed tine assembly having a central attaching portion 11, coil spring portions 12 upon each side thereof, and an elongated and angulated cylindrical tine portion 13 extending downwardly from the distal ends of the spring portions with both tines being in substantial spaced and parallel relationship and angulated adjacent the lower ends thereof as at 14 all of which is conventional.

However, it will be appreciated that other cylindrical spring tines are available either single or double and the present invention is adapted for use with any such tine whether it be used on harrows, packers or the like.

The invention collectively designated 15 is a mini-cultivator shovel substantially arrow shaped when viewed in plan and comprising a pair of side plates 16 which diverge outwardly and rearwardly from a front apex 17, one upon each side of a longitudinal axis indicated by the dotted line 18.

These side plates also slope downwardly and outwardly from the common central crown 19 as clearly shown from the drawings, particularly FIGS. 1 and 7.

The distance between the extremities 20 of the rear corners of the wings is approximately 2 inches but this dimension can of course be varied depending upon design parameters.

A cylindrical collar 21 is secured as by welding at the rear end of the crown 19 and upon the longitudinal axis 18 and is nested between the rear portions 22 of the wings of side plates 16 and the diameter of the bore 23 extending substantially vertically through this collar is slightly more than the diameter of the cylindrical tine 13 upon which the device is to be used.

In the present embodiment, a nut 24 is welded to the rear side wall of this collar and a set screw 25 screw threadably engages this nut and through a bore (not illustrated) formed through the wall of the collar as clearly shown in FIGS. 2 and 3.

This enables the cultivator attachments to be slid onto the lower ends of the tines and held in the desired relationship with the tine, by tightening the said screws or bolts 25. In operation, a small cultivator shovel is normally required for each tine of the harrow.

In a conventional construction, there are approximately 32 tines per 5 feet of width of harrow so that with an 80 foot harrow, there are approximately 512 tines and hence 512 mini-cultivators.

In operation, and assuming substantially surface cultivation, the shovels or cultivators 15 are situated spaced upwardly from the lower ends 13A of the tines as shown in FIG. 4. If sub-coil cultivation is required then the cultivators are situated lower down the tines towards the lower end 13A as shown in FIG. 5 thus giving a sub-soil cultivating action.

It it is desired to use the cultivators as packers, they are reversed in position and placed upon the tine 13 upside down with reference to FIGS. 4 and 5, as shown in FIG. 6 and are situated to operate upon the surface of the soil.

Harrows converted by the attachment of these mini cultivators need a lot less power to pull them than a regular cultivator but they kill weeds and volunteer crop or break up a crust, for example, on a flax field better than the use of harrows alone.

Also, because of the coverage provided by the mini cultivators, it is only necessary normally to travel the field once instead of the two or three times needed with a ⅝ths of a diameter inch tine harrow.

When set as shown in FIG. 4, (approximately 2 inches from the lower ends 13A, the attachments skim the soil to break a crust and mounted near the end of the tine, the mini-cultivators work underground almost as deep as the tine would normally penetrate.

When set for sub-soil penetration, the mini cultivator attachments are ideal for incorporation of chemicals such as herbicides and the like particularly as the two inch width of the sweeps of the cultivators provides extensive coverage when used on every tine. They are also particularly useful in areas where a large amount of summerfallow requires minimum till.

When used reversed as mini-packers, the soil is left grooved and slightly lumpy which appears to resist wind erosion more than normal and of course the combination of such mini packers with a tine harrow provides a light weight cultivator and packer at a much more economical cost than a full sized cultivator.

Finally, a 80 foot wide tine harrow with the mini-cultivator attachments is much easier to transport than the equivalent in a full sized cultivator which normally does not extend to such widths.

It will also be appreciated than the normal adjustments provided to tine harrows can be used to set the mini-cultivators at the desired angular relationship with the ground whether used in a cultivator mode or in a packer mode.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. In combination, a spring harrow tooth having a substantially cylindrical, elongated tine, and a small sweep type shovel cultivator attachment having a longitudinal axis and comprising a centrally located cylindrical collar, means detachably securing said collar around the tine, said collar being adjustably positionable from a position adjacent the lower end of the tine and upwardly therefrom, said shovel being substantially V-shaped when viewed in plan with a pair of side plates diverging rearwardly at an acute angle from a front apex thereof, one upon each side of said collar, said plates sloping outwardly and downwardly at an acute angle from a longitudinal crown sloping upwardly and rearwardly from the apex.

2. The attachment according to claim 1 in which said collar is oriented perpendicular to the longitudinal axis of said shovel.

3. The attachment according to claim 2 in which said means detachably securing said collar around said tine includes screw-threaded means on the wall of said collar and extending therethrough, along the longitudinal axis of said shovel and bolt means screw-threadably engaging through the wall of said collar and engaging said tine.

4. The attachment according to claim 3 which is reversible upon said tine between a cultivator mode and a packing mode.

5. The attachment according to claim 2 which is reversible upon said tine between a cultivator mode and a packing mode.

6. The attachment according to claim 1 in which said means detachably securing said collar around said tine includes screw-threaded means on the wall of said collar and extending therethrough, along the longitudinal axis of said shovel and bolt means screw-threadably engaging through the wall of said collar and engaging said tine.

7. The attachment according to claim 6 which is reversible upon said tine between a cultivator mode and a packing mode.

8. The attachment according to claim 1 which is reversible upon said tine between a cultivator mode and a packing mode.

9. In combination
a double spring toothed tine assembly having a central attaching portion, two coil spring portions, one on each side of the attaching portion and two elongated cylindrical tine portions each extending from a distal end of a respective one of said coil spring portions, with the tine portions in substantially spaced, parallel relation,
cultivator attachment means, said attachment means including two relatively small sweep type shovels, a centrally located cylindrically apertured collar secured to each of said shovel and means detachably securing each said shovel by said collar around a respective one of said tines, each said shovel being adjustably positioned from a position adjacent the lower end of the respective one of said tines and upwardly thereof, each said shovel being substantially V-shaped when viewed in plan and comprising a pair of side plates diverging rearwardly at an acute angle from the front apex thereof, one upon each side of said collar, said plates sloping outwardly and downwardly at an acute angle from the longitudinal axis thereof.

10. The combination according to claim 9 in which each said collar is apertured perpendicular to the longitudinal axis of said shovel.

11. The combination according to claim 10 in which said means detachably securing each said shovel to a respective one of said tines includes screw-threaded means on the wall of said collar and extending therethrough, along the longitudinal axis of said shovel and bolt means screw-threadably engaging through the wall of said collar and engaging the associated tine.

12. The combination according to claim 11 in which said attachment is reversible upon said tine between a cultivator mode and a packing mode.

13. The combination according to claim 10 in which said attachment is reversible upon the said tine between a cultivator mode and a packing mode.

14. The combination according to claim 9 in which said means detachably securing each said shovel to a respective one of said tines includes screw-threaded means on the wall of said collar and extending threthrough, along the longitudinal axis of said shovel and bolt means screw-threadably engaging through the wall of said collar and engaging said tine.

15. The combination according to claim 14 in which said attachment is reversible upon the said tine between a cultivator mode and a packing mode.

16. The combination according to claim 9 in which said attachment is reversible upon said tine between a cultivator mode and a packing mode.

17. In combination, a spring harrow tooth having a substantially cylindrical, elongated tine and a packing attachment therefor, said packing attachment having a longitudinal axis and comprising a centrally located cylindrical collar, means detachably securing the collar around the tine, the collar being adjustably positioned from a position adjacent the lower end of the tine and upwardly therefrom, said attachment being substantially V-shaped when viewed in plan with a pair of side plates diverging rearwardly at an acute angle from a front apex thereof, one upon each side of said collar, said plates sloping outwardly and upwardly at an acute angle from a longitudinal crown of said attachment sloping downwardly and rearwardly from the apex.

18. In combination a double spring toothed tine assembly having a central attaching portion, two coil spring portions, one on each side of the attaching portion and two elongated cylindrical tine portions each extending from a distal and from a respective coil spring portion, with the tine portions in substantially spaced, parallel relation, and packer attachment means including two small packer attachements, each with a centrally located cylindrically apertured collar detachably secured to a respective one of the tines and a pair of side plates carried by the collar and diverging rearwardly at an acute angle from a front apex of the packer attachment, one plate upon each side of the collar, the plates sloping outwardly and upwardly at an acute angle from the longitudinal axis of one of the packer attachments.

* * * * *